J. NORRIS, Jr.
KAFIR CORN HEADING MACHINE.
APPLICATION FILED MAY 24, 1907.
923,691.
Patented June 1, 1909.
2 SHEETS—SHEET 1.
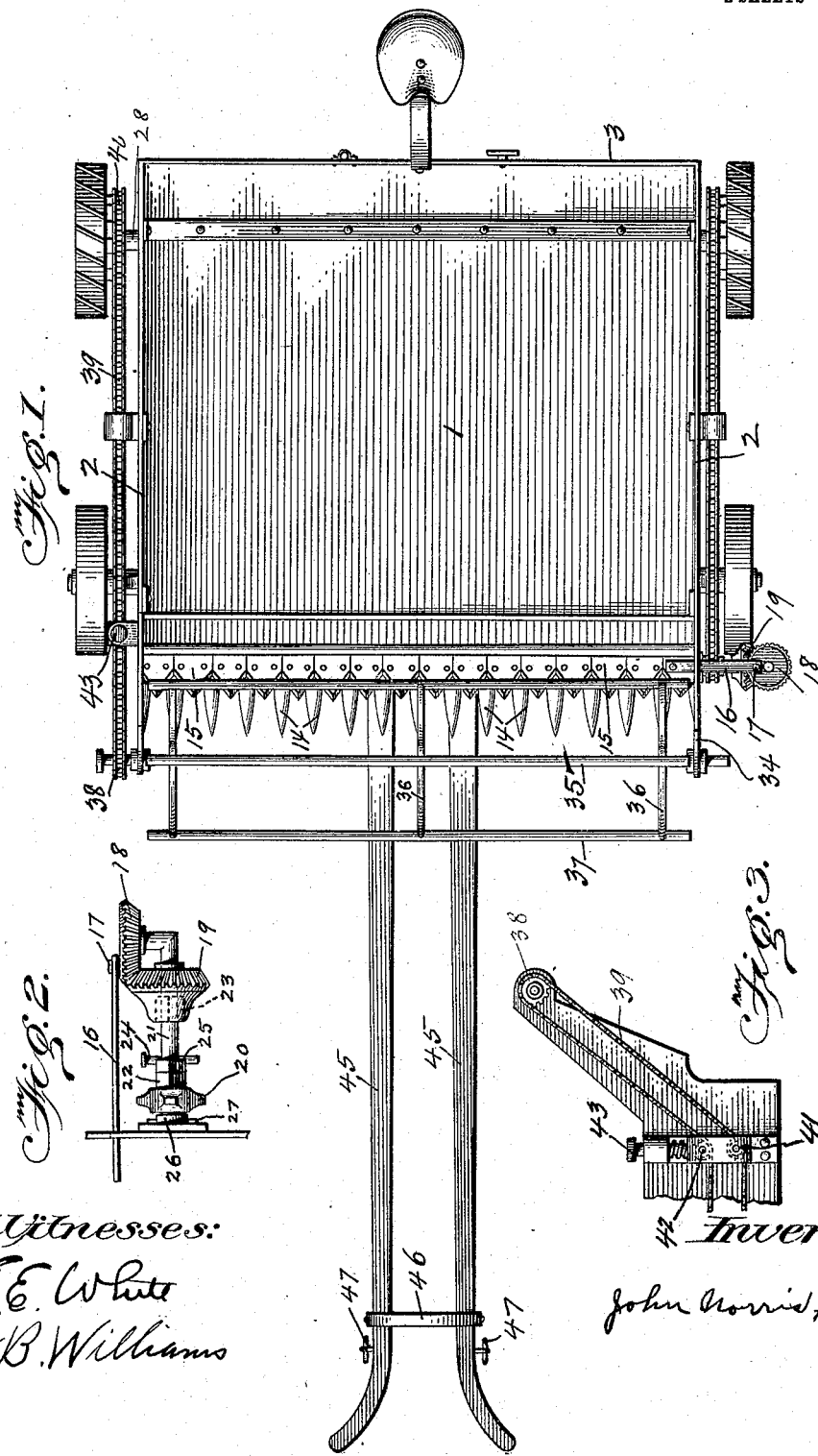
Witnesses:
C. E. White
J. B. Williams
Inventor:
John Norris, Jr.
THE NORRIS PETERS CO., WASHINGTON, D. C.

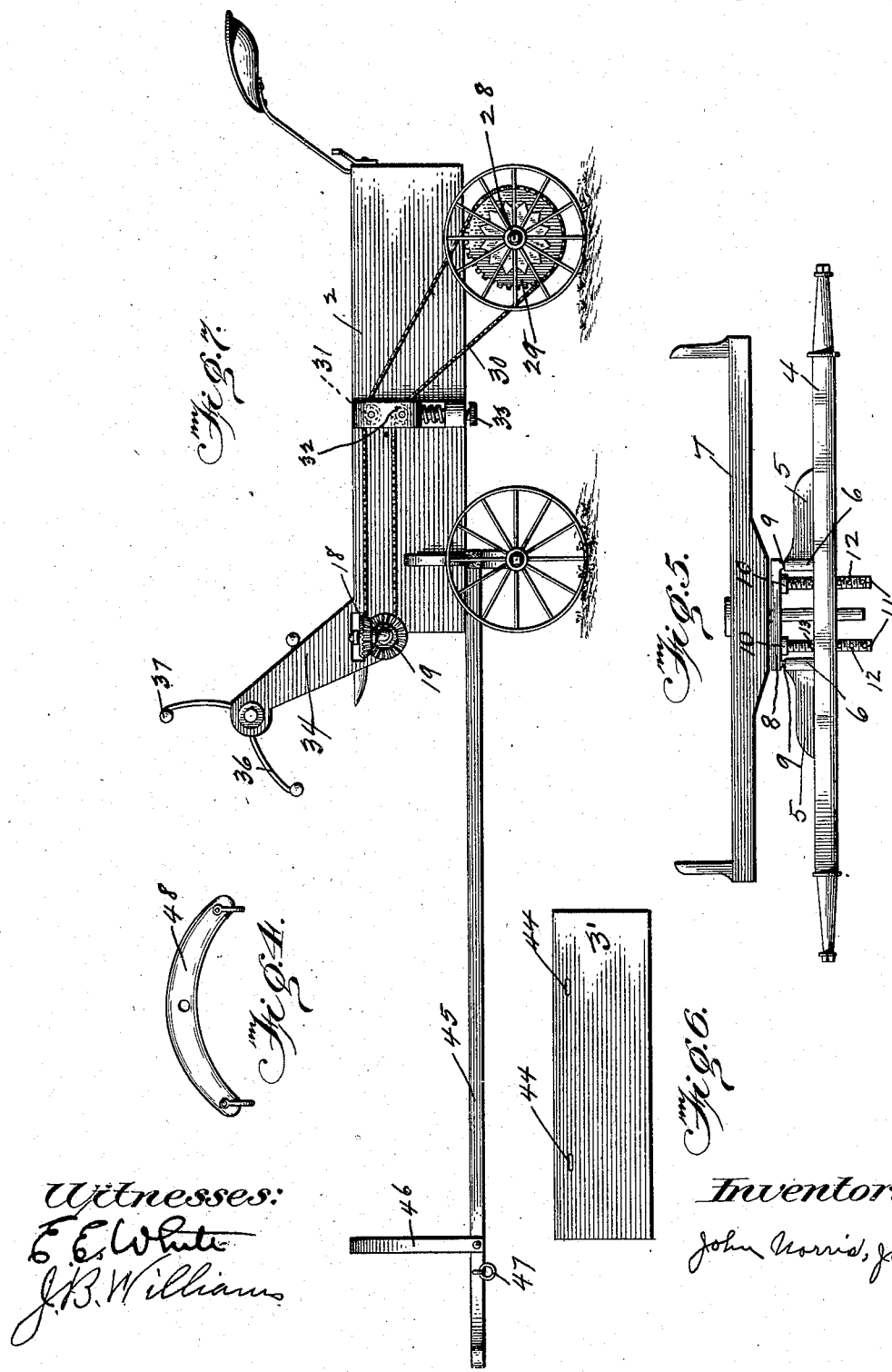

UNITED STATES PATENT OFFICE.

JOHN NORRIS, JR., OF QUAIL, TEXAS.

KAFIR-CORN-HEADING MACHINE.

No. 923,691.  Specification of Letters Patent.  Patented June 1, 1909.

Application filed May 24, 1907. Serial No. 375,497.

*To all whom it may concern:*

Be it known that I, JOHN NORRIS, Jr., a citizen of the United States, residing at Quail, in the county of Collingsworth and State of Texas, have invented certain new and useful Improvements in Kafir-Corn-Heading Machines, of which the following is a specification.

My invention relates to Kafir-corn heading machines and has for its object to generally improve, simplify, and increase the efficiency and practicability of machines of this type.

Further and other objects of the invention will later be apparent.
In the drawings Figure 1, is a top plan view of the completed machine, Fig. 2, is a detail of the cutter bar operating means, and the clutch therefor, Fig. 3, is a detail showing the chain, and its cushioning means for driving the reel, the view being taken at the front side on the right of Fig. 1, Figs. 4, 5, and 6 are detail views, and Fig. 7 is a side elevation.

The box or body of the machine is formed of a bottom 1, sides 2, 3′ the front board and 3, the rear board the whole being mounted on wheeled axles as shown. The axle 4 at the front of the machine is provided with extensions 5, formed with enlarged perforated heads 6. Bolster 7, seats on an inverted U-shaped support 8, the depending legs 9 of which engage in the perforations of heads 6, and receive guiding movement therefrom. Support 8, seats on enlarged heads 10, of a pair of threaded rods 11, by rotation of which latter the bolster and consequently the wagon body can be raised or lowered to properly position the cutting apparatus in cases where the corn is of greater or less height than in others. Rods 11, have transverse openings 12 through which pins 13 engage to seat on the axles and prevent accidental retrograde movement of the rods after having been raised to desired elevation.
The finger bar which is composed of a series of curved fingers 14, is secured to the top side of the front end gate 3. The sickle 15 is in superimposed relation to the finger bar and is given reciprocating movement by means of arm 16, attached thereto and connected to a pin 17, eccentrically mounted on the bevel gear 18, which latter meshes with a bevel gear 19.

Fig. 2 shows a clutch or coupling whereby gear 19 may remain quiescent and thus cause the sickle to be inoperative. This clutch consists of a driven sprocket 20 loose on supporting shaft 21, the sprocket having a hub 22, which when slid into recess 23, of gear 19, couples 20 and 19 so that the same will rotate in unison. 24 designates a pin extending transversely through an aperture, provided therefor on shaft 21, to hold sprocket 20 in either coupled or uncoupled position.

25 is a washer grooved on one face to have pin 24, project partly thereinto whereby the sprocket 20, is held out of operation.

26 denotes a second washer on the opposite side of sprocket 20, which washer is also formed with a groove in its outer face which groove as shown in Fig. 2, is engaged by a rib 27, rigidly secured to one of the washer sides. To couple sprocket 20 with gear 19, pin 24 is removed, and sprocket 20, with its washers 25 and 26 is slid along the shaft so that washer 25 and hub 22 will project in recess 23, of gear 19. Washer 26 is then slid on the shaft so that it engages sprocket 20, after which pin 24 is again placed in its opening in shaft 21, projecting partly in the groove of washer 26 and thus locks the parts.

Rear axle 28 carries a large toothed wheel 29 over which chain 30 passes to engage the sprocket wheel 20. 31, denotes a stationary guiding wheel for chain 30 on one of the sides 2 of the wagon body, and 32, a second guide wheel which latter has a resilient mounting due to being disposed on a spring pressed rod 33.

A reel is carried by extensions 34, which are secured to the wagon sides, said reel comprising a shaft 35, journaled in said extensions, radial arms 36, secured to shaft 35, and horizontal beater arms 37. Shaft 35, is driven by means of sprocket 38 thereon over which passes chain 39, the latter being driven from toothed wheel 40, on rear axle 28. As shown in Fig. 3, chain 39 passes over stationarily supported guide wheel 41 and resiliently mounted guide wheel 42, the latter mounted on spring-pressed rod 43.

As depicted in Fig. 6, front board 3′, has openings 44 therein for reins of the horses, harness to pass through and be guided by.

A double tongue is employed composed of longitudinal spaced bars 45 secured at one end to the wagon and at their opposite ends being curved outwardly, the bars being connected by a spring arch 46 of inverted U-shape adjacent their free ends and also having rings 47, secured thereto to engage the breast straps of the harness. A horse is hitched on the outer side of each of bars 45, the stalks of the middle row extending in the space between bars 45. The curved ends of bars 45, direct the stalks on each side of the bars into the space between the latter and thus prevent the horses from tramping down the same.

Fig. 4 shows a curved double tree 48 which allows it to be attached behind the finger bar so as to not interfere with the stalks during the approach of the cutting apparatus.

What I claim is:

1. In a machine of the type set forth, running gear having a receiving box thereon, cutting apparatus thereon, said apparatus embodying a finger bar arranged on top of the box front, a sickle bar mounted on said finger bar, a pitman connected to said sickle bar, a gear having a pin eccentrically arranged thereon and connected to said pitman, extensions carried by said box leading upwardly and forwardly therefrom, a reel mounted in said extensions, and means actuated by the running gear for operating said gear and said reel.

2. In a machine of the type set forth, in combination with a wagon running gear and box thereon, cutting apparatus on said box, a rotatable reel on said box, means to operate said reel and cutting apparatus, means to guide the stalks to said cutting apparatus and provide space for the draft animals, and means for raising or lowering said box with respect to said running gear.

JOHN NORRIS, Jr.

Witnesses:
S. G. ALEXANDER,
M. F. ROBERTS.